(12) United States Patent
Menon

(10) Patent No.: US 10,784,974 B2
(45) Date of Patent: Sep. 22, 2020

(54) METHOD AND SYSTEM FOR ISOLATING RELATED EVENTS IN THE PRESENCE OF SEASONAL VARIATIONS

(71) Applicant: Spectrum Effect Inc., Kirkland, WA (US)

(72) Inventor: Rekha Menon, Kirkland, WA (US)

(73) Assignee: Spectrum Effect Inc., Kirkland, WA (US)

( * ) Notice: Subject to any disclaimer, the term of this patent is extended or adjusted under 35 U.S.C. 154(b) by 0 days.

(21) Appl. No.: 16/044,421

(22) Filed: Jul. 24, 2018

(65) Prior Publication Data

US 2020/0036459 A1   Jan. 30, 2020

(51) Int. Cl.
*H04L 1/00* (2006.01)
*H04B 17/345* (2015.01)
*H04B 17/354* (2015.01)
*H04B 17/391* (2015.01)

(52) U.S. Cl.
CPC ......... *H04B 17/345* (2015.01); *H04B 17/354* (2015.01); *H04B 17/391* (2015.01)

(58) Field of Classification Search
None
See application file for complete search history.

(56) References Cited

U.S. PATENT DOCUMENTS

| | | | |
|---|---|---|---|
| 6,393,277 B1 * | 5/2002 | Sahin | H04W 16/18 455/423 |
| 6,735,436 B1 * | 5/2004 | McCauley | H04W 24/00 455/423 |
| 2008/0247327 A1 * | 10/2008 | Weil | H04L 43/50 370/252 |
| 2017/0034720 A1 * | 2/2017 | Gopalakrishnan | H04W 16/18 |
| 2017/0181127 A1 * | 6/2017 | Hampel | H04L 5/0048 |
| 2019/0311297 A1 * | 10/2019 | Gapper | G06K 9/00523 |

* cited by examiner

*Primary Examiner* — Clemence S Han

(57) ABSTRACT

This disclosure provides a method and system that isolate non-seasonal components of network measurements from the seasonal components and compare the non-seasonal components to determine cause and effect relationships between various network nodes, to determine whether an event at a first node is experienced at a second node, and/or to characterize and localize a source of interference.

13 Claims, 10 Drawing Sheets

METHOD AND SYSTEM FOR ISOLATING RELATED EVENTS IN THE PRESENCE OF SEASONAL VARIATIONS

BACKGROUND

The wide adoption of mobile devices along with ubiquitous cellular data coverage has resulted in an explosive growth of mobile applications that expect always-accessible wireless networking. This growth has placed demands on network performance including demands for fast and reliable communication paths, which causes increasing strain on the limited radio-frequency (RF) spectrum allocated to wireless telecommunication. Accordingly, efficient use of the limited spectrum is increasingly important to the advancement of wireless communication technology.

Interference is a barrier to efficient use of wireless spectrum. Modern wireless communications operate in interference limited environments where signal quality to and from network subscriber devices is limited in part by interference from other users served by the same or nearby cells. The design and optimization of these networks are based on having clear spectrum occupied only by radio frequency transmitting equipment associated with the specific network. However, this ideal of clear spectrum occupied only by intended users of the system is not always achieved.

Real world systems often experience unexpected network interference which may originate from intentional and or unintentional radio frequency (RF) generating sources. These potential interference sources include many things such as industrial machinery, electronics test equipment radiating signals in the bands of interest, undesired mixing products generated by the licensed system itself and illegal radio sources. The result of these system interference sources is degraded system service and reduced wireless network capacity and coverage as the intentional system signals suffer capacity and quality losses due to these interferers.

Conventional approaches for detecting and subsequently locating these network interferers typically involve intentionally disabling transmitting equipment across large areas of the network coverage area and searching for interference sources using sensitive receiving equipment and directional antennas. These methods are very costly as they involve turning off the revenue-generating network equipment and deploying teams in the field, typically during maintenance windows, which are low network utilization times such as the middle of the night. If network interferers are only present outside of these search times, then they will not be detected or located as part of these searches.

Another approach to interference detection involves deployment & utilization of dedicated energy measurement probes throughout the serving areas. Energy detection probes in this context are radio receiving devices that quantify energy levels detected within defined radio frequency bands, as opposed to data level probes that detect information in RF transmissions. However, there are substantial costs associated with installing, maintaining and monitoring probes, and a large number of probes would be required to effectively cover network areas.

Cellular operators employ a variety of strategies for handling interference caused by legal, licensed transmissions. Many of the strategies depend on accurately characterizing the interference in time, frequency and spatial domains. In addition, it is very helpful to know cause and effect relationships between various network elements. For example, if an operator knows that interference to a cell is caused by a particular base station, the operator may mitigate the interference by reducing the transmit power of the base station, or changing the tilt of an antenna of the cell.

Wireless communication networks would benefit from additional tools for identifying and characterizing interference in frequencies used for wireless communication, and tools that help to understand cause and effect relationships between nodes in a wireless network.

TECHNICAL FIELD

Embodiments of the present disclosure relate to comparing non-seasonal components of measurements in a wireless telecommunications network.

BRIEF SUMMARY

This disclosure describes techniques to identify related events from node measurements in the presence of seasonal variations in the measurements. Embodiments of this disclosure include methods and systems for removing seasonal components from interference over time. After seasonal components are removed, interference can be effectively correlated between network nodes to characterize the interference, identify a source of the interference, and determine the extent to which an event at a first node effects a second node. Some embodiments can determine whether interference at a first node is caused by a second node.

In an embodiment, a method for a wireless telecommunications network includes receiving first event measurements of a first event that were measured at a first node of a wireless communication network over a time interval, receiving second event measurements of a second event that were measured at a second node of the wireless communication network over the time interval, removing seasonal components from the first event measurements to create first non-seasonal event data, removing seasonal components from the second event measurements to create second non-seasonal event data, and comparing the first non-seasonal event data with the second non-seasonal event data to determine whether the first event measured by the first node correlates with the second event measured at the second node. In an embodiment, the method includes measuring the events. The first and second events may be interference.

When the first and second events are interference, when the first event experienced by the first node correlates with the second event measured at the second node, determining that the first node and the second node are both affected by the same interference. In addition, a location for a source of the interference may be determined.

In an embodiment in which the first and second nodes are co-sited cells, the method includes receiving interference measurements for a plurality of cells that are neighbors of one or both of the co-sited cells, removing seasonal components from the neighbor interference measurements to create non-seasonal neighbor interference data, and comparing at least one of the first non-seasonal event data and the second non-seasonal event data with the neighbor interference data to determine whether a correlation is present. When no correlation is present, an embodiment may determine that interference experienced by the co-sited cells is local to a cell site of the co-sited cells.

In an embodiment, the first event is interference and the second event is network traffic. In such an embodiment, the method may further include determining that the network traffic at the second node causes the interference at the first node.

In an embodiment, the first non-seasonal event data is a trend component of the first event data, and the second non-seasonal event data is a trend component of the second event data. The method may further include measuring the first event at the first node and measuring the second event at the second node. Time-series decomposition may be performed on the first and second measurement data to remove the seasonal components.

Embodiments of the present disclosure may be implemented as a non-transitory computer readable medium with computer-executable instructions stored thereon which, when executed by a processor, access first event measurements of a first event that were measured at a first node of a wireless communication network over a time interval, access second event measurements of a second event that were measured at a second node of the wireless communication network over the time interval, remove seasonal components from the first event measurements to create first non-seasonal event data, remove seasonal components from the second event measurements to create second non-seasonal event data, and comparing the first non-seasonal event data with the second non-seasonal event data to determine whether the first event measured by the first node correlates with the second event measured at the second node. An embodiment may be implemented on a server computer such as a spectrum analysis server.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
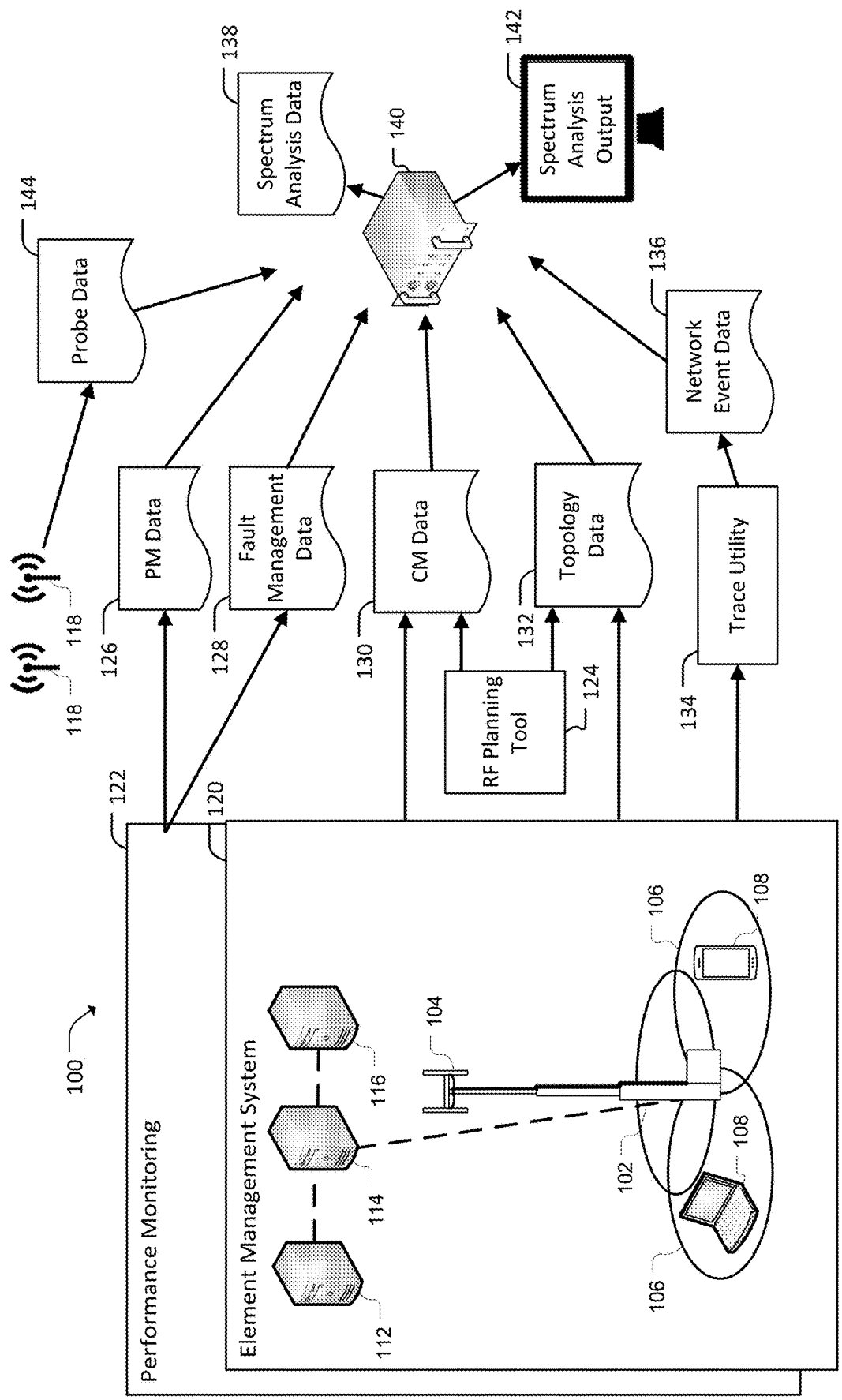
FIG. 1 illustrates a system for identifying interference in a cellular communications network according to an embodiment.

FIG. 1 illustrates a networked spectrum analysis system 100 according to an embodiment. The system 100 integrates information from available wireless network sources to detect, isolate, characterize and locate undesired radio frequency interference in the context of a wireless network. Sources of this information, which are hardware elements of a wireless network, are available in typical wireless cellular networks, but they are not conventionally connected and configured in the manner suggested by this disclosure. In particular, the spectrum analysis server 140 is a novel component of a telecommunications network.

A radio access portion of system 100 may include one or more base stations 102, each of which are equipped with one or more antennas 104. Each of the antennas 104 provides wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, NR, etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base station 102 may be outfitted with an omnidirectional antenna that provides service to a single cell for a given RAT.

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that are provided with wireless communications services by a base station 102.

The system 100 may include a backhaul portion 110 that can facilitate distributed network communications between core elements 112, 114 and 116 and one or more base station 102 within a cellular network. In an embodiment, the backhaul portion of the network includes intermediate links between a backbone of the network which is generally wire line, and sub-networks or base stations 102 located at the periphery of the network. The network connection between any of the base stations 102 and the rest of the world may initiate with a link to the backhaul portion of a provider's communications network. A backhaul 110 may include an X2 connection through which base stations 102 communicate with one another directly.

The core network devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON)

server, an Evolved Serving Mobile Location Server (eS-MLC), a Home Subscriber Server (HSS), etc. Persons of skill in the art will recognize that core network devices 112, 114 and 116 are different depending on the particular RAT or set of RATs that are present in the network. The core network devices support a radio access portion of the network that includes the base stations 102.

Elements of the communications network 100 are part of an Element Management System (EMS) 120 and a Performance Monitoring (PM) system 122. The PM system 122 may include base stations 106 as well as core network equipment that collect and process performance data and performance metrics for the network. A spectrum analysis server 140 interfaces with various network components, including components of the PM system 122 and the EMS 120.

Although FIG. 1 shows the spectrum analysis server as a single, discrete component, embodiments are not so limited. For example, in other embodiments, components of the spectrum analysis server 140 may be distributed among multiple computing entities. In addition, hardware for the spectrum analysis server may perform processes not directly related to interference.

The performance monitoring system 122 generates performance data 126 for the wireless network. The PM data 126 may be derived from observations of network performance, which may be reported at a predetermined time interval, e.g., every minute, 5 minutes, 15 minutes, hourly or daily. PM data 126 may include raw event counts (e.g. counts of dropped calls or handover failures during the observation period) or complex derived performance indicators (e.g. noise rise normalized by user loading, Channel Quality Indicator (CQI) distribution statistics normalized by data volume, etc.).

In some embodiments, PM data 126 includes data input from a dedicated PM tool, as well as data received directly from EMS 120, or elements of the Operations and Support System (OSS). In an embodiment, PM data 126 may be derived directly from network event data by the spectrum analytics server 140. For example, in an embodiment, when event data 136 is available to the spectrum analysis server 140, the server may aggregate individual events to create equivalent PM counters and Key Performance Indicators (KPIs). Thus, in some embodiments, PM data 126 is derived from sources other than a PM system 122.

Fault Management Data 128 may be transmitted from the PM system 122 to spectrum analysis server 140. Fault Management Data 128 includes, for example, alarm data that indicates performance issues at one or more cell site.

Configuration Management (CM) data 130 is input to the spectrum analysis server 140 from EMS 120. CM data 130 includes the current configuration of various wireless network equipment, such as the configuration of base stations 102 and core components such as Radio Network Controllers.

CM Data 130 is quasi-static and typically only updated as a result of network optimization such as cell splitting, cell ID reassignment, changes in operating frequency or transmit power, etc. CM data 130 may include pertinent information such as cell technology (e.g., 2G GSM, 3G UMTS, 4G LTE, 5G NR) associated with physical and logical network elements, operating frequency, transmit power, reuse codes, type of cell (e.g. macro, micro, pico cell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g. indoor, outdoor, distributed antenna system, etc.), etc. In addition to interference detection and characterization, topology data 132 may be used to aid in correlating PM data 126 and network event data 136 against actual physical locations, and for understanding physical distance relationships between network elements.

RF planning tool 124 has network planning information used to determine cell site positions and pertinent parameters such as sector pointing angles. Network parameters established via automated or manual network planning processes may be used to configure the actual network equipment and serve as source information for some of the CM data 130 and Topology data 132. Alternative embodiments may include a direct data connection between entities that perform RF planning functions and the spectrum analysis server 140, provided that the network CM data 130 and topology data 132 is available to support processes described in this disclosure.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is reported at intervals of a few seconds, it can be used to determine variance of conditions over time at relatively short intervals, such as five minutes, one minute, 30 seconds, or as low as the reporting interval, which may be two seconds.

Network event data 136 includes call event data, or cell trace data according to LTE terminology. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, RSSI measurements, and protocol messages. Network event data 136 is not conventionally used for interference detection, characterization or localization.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used as part of the interference detection processes described by this disclosure.

The collection point for network event data 136 varies between specific wireless technologies and may vary in vendor-specific implementations. For instance, network event data 136 is typically collected at the RNC entity in 3GPP defined 3G networks (i.e., UMTS, HSPA), but network event data 136 is collected by the eNodeB entity in 4G LTE systems. Network event recordings may be pulled directly from the network elements that store the events by the spectrum analysis server 140, or automatically stored on a separate data storage server, or staging server, such that external systems such as the spectrum analysis server 140 may access network event data 136 without incurring additional data loading on the network elements. Accordingly, it should be understood that network event data 136 may be collected, stored and retrieved in various ways in different embodiments.

The network event data 136 may be collected by a trace utility 134 that is integrated with a cellular network. Trace concepts and requirements are explained, for example, in the Third Generation Partnership Project (3GPP) Technical Specification TS 32.421.

An embodiment may use network event data 136 without using any PM data 126. In such an embodiment, spectrum analysis does not use input from a dedicated Performance Monitoring system 122, but may derive base station performance indicators directly from network event data 136. In such an embodiment, network event data records may be aggregated to determine sub-performing cells and determine high noise rise cells.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

Also shown in FIG. 1 is a plurality of energy sensing probes 118, which may be dedicated to the task of sensing energy in particular frequencies and reporting energy detection results. Energy sensing probes 118 may be installed at various locations in a network, and may be tuned to detect energy on one or more frequencies that are used for wireless communications. Although embodiments of this disclosure do not require the deployment of dedicated energy sensing probes 118, their use is not precluded.

In an embodiment that uses dedicated energy detection probes 118, energy measurements derived directly from the detection probes are used in conjunction with or in place of energy measurements derived from network event data 136 as inputs to the spectrum analysis server 140. Subsequently, the measurements from dedicated energy detection probes 118 may be correlated with known probe positions and probe configuration characteristics (e.g. directional antennas) as well as current network loading data to enhance the detection of undesired radio frequency interference within the network.

Probe data may in some cases be broadband and cover wider spectrum segments than the operational wireless network, and as such may be used to monitor bands adjacent to or even highly separated from current wireless bands. Such broadband spectrum analytics sensing may be used to support frequency agile spectrum sharing solutions whereby internal band metrics, e.g. network event data correlated with topology and CM data, as well as probe supported broad band metrics, to enhance performance of spectrum analytics.

The spectrum analysis server 140 represents a specific processing device that interfaces with one or more of the external data sources described above. The spectrum analysis server 140 may perform one or more interference detection, analysis, comparison, characterization and localization processes described in this disclosure. In an embodiment, the spectrum analysis server 140 is physically located in an operator's Network Operations Center (NOC). From a logical perspective, the spectrum analysis server 140 is located in the Operations Support System (OSS) plane. The spectrum analysis server 140 may perform one or more of the specific processing steps described below.

Figure 2:
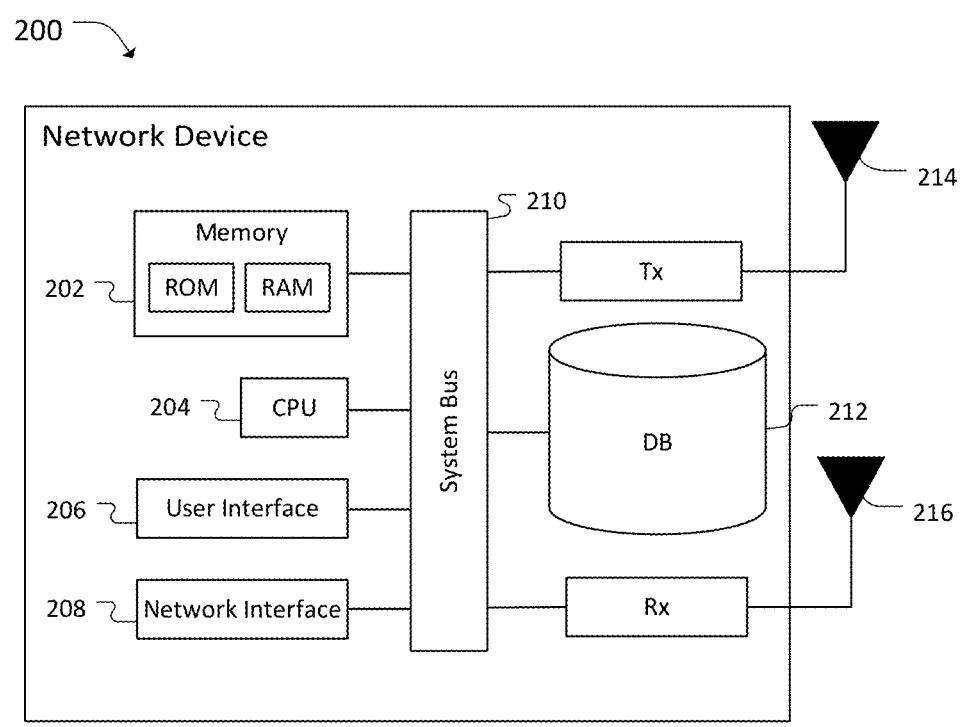
FIG. 2 illustrates a network device according to an embodiment.

FIG. 2 illustrates a block diagram of a network device 200 that may represent UE 108, network controller devices 110, 112 and 114, a spectrum analysis server 140, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-volatile computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device 200 has wireless connectivity, it may have a transmitter 214 and a receiver 216, each of which may include one or more antennas that operate on one or more frequencies.

Wireless network nodes in telecommunication networks make periodic measurements of interference. The interference measurements can be used to adapt network parameters to optimize performance in the presence of interference. However, it is important to characterize the interference in order to implement appropriate optimization processes. For example, some types of interference, such as Passive Inter-Modulation (PIM) interference, are localized to a single base station.

PIM interference can be caused by oxidation of metal base station components, so base station sites are more susceptible to PIM interference as they age. While operators typically check base station components for oxidation when they are installed, base stations are rarely checked after they are installed. Accordingly, PIM interference is a common problem in cellular networks.

PIM can be characterized by mixing the frequencies of multiple RF signals, which may include summing or subtracting frequencies. The resultant product frequency is typically outside of the range of licensed cellular spectrum. However, third order intermodulation products of PIM may be closer in frequency to the original signals, so third order PIM products frequently degrade network performance. Other causes of highly localized non-network interference include sparking transformers and industrial machinery. In addition to localized non-network interference, cells experience interference from transmissions within the network itself.

Processes used to handle localized non-network interference are different from processes used to handle interference from within the network. Non-network interference is typically handled by locating and eliminating the interference source. For example, PIM interference can be mitigated by identifying and cleaning an oxidized terminal, and interference from a sparking transformer can be mitigated by replacing the transformer. Network interference can be handled in a number of ways, including adjusting network parameters such as power, frequency, antenna azimuth and beamwidth, and changing how transmissions are scheduled.

In order to implement the most effective processes for handling interference, it is important for networks to accurately characterize the interference. Since the techniques for handling PIM interference are typically very different from the techniques for handling a misconfigured base station, it is desirable to characterize the interference sufficiently to understand whether the interference is localized, or the spatial characteristics of the interference. In addition, it can be very useful to determine cause and effect relationships between network nodes, e.g. to determine whether an event at a first node causes interference at a second node.

Correlations can be established between relevant measurements at various nodes in order to determine whether different nodes are impacted by the same event or to find cause and effect relations between events at different nodes. However, factors other than the relationships that operators are interested in identifying impart significant seasonality to the measurements at the nodes. For example, over the period of a day, wireless network nodes typically see high traffic around the commute times, e.g. 8-10 AM and 4-7 PM, and low traffic in the night. This introduces a daily seasonal pattern to measurements.

Similarly, seasonal changes with an annual duration, such as foliage on deciduous plants, average temperatures and rain patterns, introduce an annual seasonal pattern to RF measurements. Other seasonal variations may be present on a weekly scale, where network conditions vary according to the days of a week, a month, a year, etc. Depending upon the time frame used for performing correlations, seasonal patterns of varying durations can increase the correlation between measurements resulting in inaccurate inferences from a correlation analysis. In some instances, the seasonal component of interference data over time is so great that it overwhelms other components of the interference data and indicates a correlation between nodes when no actual correlation is present. Therefore, seasonality is a major problem when correlating interference over time between nodes.

Figure 3:
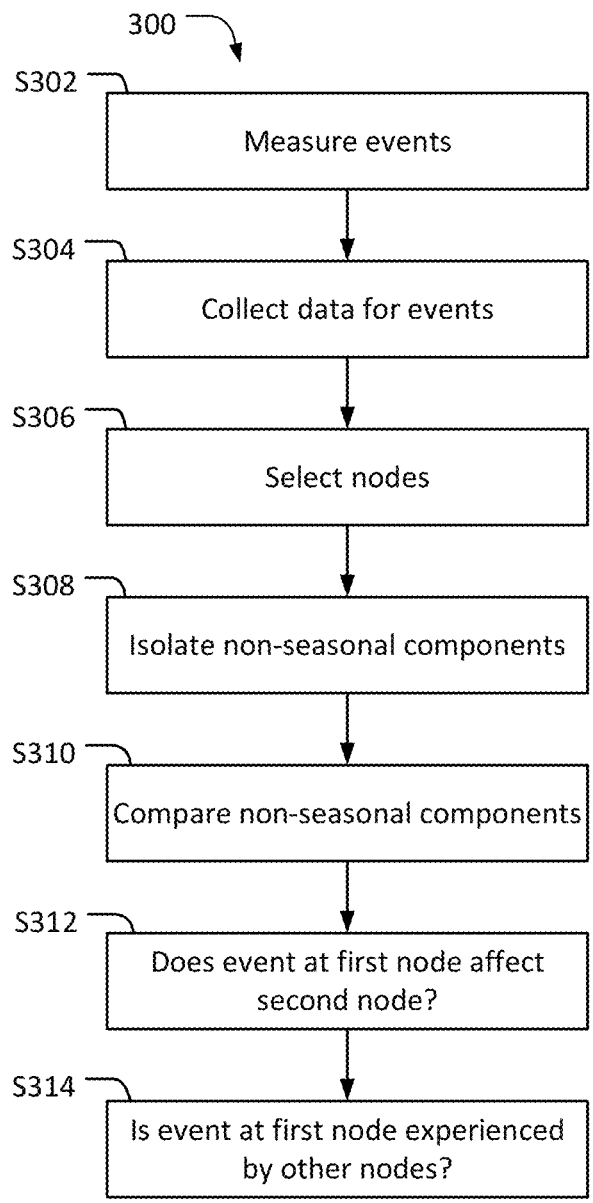
FIG. 3 illustrates an embodiment of a process for a wireless a telecommunication network.

FIG. 3 illustrates elements of an embodiment of a process 300 for a wireless a telecommunication network. In various embodiments, process 300 can be characterized, without limitation, as a process for determining correlations between events at network nodes, a process for determining whether interference experienced by a first node is experienced by one or more additional node, a process for determining whether an event at a first node affects a second node, a process for determining the geographic extent of interference, and a process for determining relationships between nodes in a wireless communication network.

Network events are measured at S302. Examples of network events that may be measured at S302 include uplink and downlink interference, uplink and downlink transmissions, transmission power levels and alarm conditions. For the sake of clarity, this disclosure uses uplink interference and transmissions to illustrate embodiments. However, the scope of this disclosure is not limited to these specific network events.

Interference may be measured by measuring RF energy that is present in one or more channel that is used for wireless cellular telecommunications. Interference may be measured by measuring RF energy levels at a network node such as a base station 102, UE 108, or a probe 118. Transmission events may be measured by one or more entity that causes the traffic, such as a base station 102 or UE 108, an entity that schedules transmissions, or one or one of the core elements 112, 114 and 116 of the element management system 120.

The measured network events are collected at a central location at S304. In an embodiment, events are reported as network event data 136 that is transmitted to a spectrum analysis server 140 as illustrated in FIG. 1. Accordingly, collecting data for events at S304 may include receiving and storing network event data 136 at spectrum analysis server 140.

The network event data 136 may be data events related to uplink or downlink energy. In more detail, network elements such as RNCs and eNodeBs may generate network events containing uplink energy measurements at a periodic interval, such as every one or two seconds. These energy measurement events may be extracted from the network event data 136. The energy measurements may be referred to, for example, as received wideband power or uplink Received Signal Strength Information (RSSI). The measurements of uplink energy may be in units that map to dBm of power on a range of approximately −120 dBm to −58 dBm.

The energy measurements in network event data 136 may represent all radio frequency energy detected on the uplink frequencies at a given wireless cell, including intentional energy generated by in-cell or neighbor cell users utilizing the wireless network. The specific measurement values may vary depending on user loading and specific user-to-base-station propagation channels, which depend on specific user positions and the local propagation environment.

Embodiments detect interference via network event data 136, which may be high sampling frequency data with energy level reporting on the order of seconds. The techniques described in this disclosure may also be applied to less frequent data sources such as network PM data including KPIs, which may be reported at longer intervals such as a single energy level KPI report every 15 minutes or one report per hour. Embodiments of this disclosure are not restricted to high sampling rate reported data. When the events are collected by a spectrum analysis server 140, the server may construct vectors from each node-measurement time-series.

When network events are collected through KPI and PM reporting, examples of specific PM counters and aggregate KPIs include Received Total Wideband Power (RTWP), received interference plus noise power, RSSI measured on downlink by UEs or measured on the uplink at the serving base station, Received Signal Code Power (RSCP) and Reference Signal Received Power (RSRP), which describe energy levels present in a channel, as well as PM data. In some embodiments, the PMs and KPIs collected in the service of collecting data for events relate to traffic levels and interference.

One or more node is selected at S306. The particular nodes that are selected depends on the goals of an entity that is performing process 300. If an operator is interested in determining whether interference experienced by a first node is also experienced by one or more neighbor node, the first node that is selected may be a node that is experiencing relatively high levels of interference as reflected by direct interference measurements, or that is experiencing reduced performance reflected by PM data 126 which could be caused by interference. Examples of nodes include cells, groups of cells, base stations and UEs.

When PM data 126 is collected to support node selection at S306, it may be used to determine that one or more network cells is failing to meet performance criteria. The particular performance metrics collected may be metrics that indicate a high probability that they are experiencing high levels of interference, such as metrics related to errors and throughput, although embodiments are not limited to such metrics.

In some embodiments, PM data 126 may be collected from a PM system or a SON system, which are typically pre-existing in networks. In some embodiments the PM data 126 can be used to identify a set of target cells based on performance metrics that indicate that the target cells are under-performing or experiencing high levels of interference. In a specific embodiment, the PM data 126 may be used to determine one or more target cell which may be experiencing external non-cellular interference, e.g. cells that suddenly begin to experience reduced performance or measured interference that is not otherwise explained by known changes to the network.

When a goal of process 300 is to determine whether an event at a first node causes an effect on a second node, the first node may be selected by an operator because changes are being made to that node, and the operator would like to know implications of those changes to other nodes. For example, an operator may wish to know whether increasing base station transmit power at a particular cell causes increased interference to UEs within a geographic area of a nearby cell. In this case, a cell may be selected as a first node and one or more UE that is within the area of the nearby cell are selected as the second node.

In some embodiments, when the first node is cell, cells that are neighbors to the first cell are selected at S306. For example, when interference is being experienced at a first cell, co-sited neighbor cells may be selected to determine whether the interference is affecting the cell site. In such an embodiment, a list of co-sited cells may be generated for the first node.

Co-sited cells are additional network cells operating at the same cell site as defined by latitude and longitude or similar absolute positioning information. In one embodiment, cells sharing the same physical location and the same operating frequency are considered co-site cells. In other embodiments, all co-located cells, regardless of technology (e.g. 3G, 4G) or specific operating frequency may be considered co-site cells for the purposes or S306. Determining co-sited cells supports correlation against, and detection of, localized interference sources at the cell site, including potential broadband interference resulting from faulty cell site equipment, and interference from transmit inter-modulation products.

The data used to identify co-sited cells may be derived, for example, from known network Topology and CM data. The CM data may be geographical coordinates such as cell latitude and longitude. An embodiment may determine additional data for the co-sited cells, including cell technology (e.g. GSM, UMTS, LTE) and cell operating frequency. These and other cell characteristics may be retrieved from CM data, or alternatively, this information may be provided by integrated tools such as SON systems that are configured to supply cell relationship information including a list of co-sited cells for each cell in a network.

In addition to detecting high noise rise cells, an embodiment of this disclosure may detect external interference originating near detected high noise rise cells. Interference can be characterized, and a source can be localized, by establishing the extent to which interference affects cells that are near to a cell that is experiencing interference. For example, neighbor cells may be used to establish a frequency range and area that is affected by interference. To achieve these and other advantages, neighbor cells of each target cell may be identified at S306.

Neighbor cells of a target cell may be determined at S306 by identifying cells that are located within a predetermined distance from the target cell. The neighbor cells may be cells that use the same technology or frequency as the target cell, as well as, or instead of, cells that use different technologies or frequencies.

In an embodiment, neighbor cells may be identified using information from Network Topology, CM and PM data, which may be utilized along with distance or other relational parameters to determine nearby cells that may be classified as neighbor cells. For instance, when utilizing latitude and longitude information, all cells within a defined linear distance may be classified as neighbors. In various embodiments, the cells that are identified as neighbors may be restricted to cells sharing the same technology and operating frequency, or extended to include all nearby operational cells of different technologies or operating frequencies.

Neighbor cell information may be determined by a tool such as a SON system, and that information may be transmitted to a spectrum analysis server 140. For example, a SON tool may automatically establish a number of tiers of separation from a target cell. In such an embodiment, the spectrum analysis server 140 may request a list of, for example, first and second tier neighbors for a target cell. In such an embodiment, determining neighbor cells may include transmitting a request for first and second tier neighbors from a SON tool, and receiving a list of cells in response to the request. Here, the concept of neighbor tiers is a term of art that is explained, for example, in PCT/US16/15227, entitled Method and System for Neighbor Tier Determination.

Event data typically varies according to seasonal cycles. Network events are commonly influenced by traffic levels which correspond to seasonal patterns. For example, network traffic tends to be higher during daylight hours than late night or early morning. In addition, network traffic can vary according to days of the week, months of the year, etc. Seasonality tends to affect nodes that are nearby to each other in the same fashion. As a result, correlations between events at different nodes can be heavily influenced by seasonal variations to the extent that seasonality causes a high correlation value between two nodes, even when low or no non-seasonal correlation actually exists between the events. In other words, seasonal components of network events cause false positives and can make it impossible to determine relationships between nodes.

Figure 4:
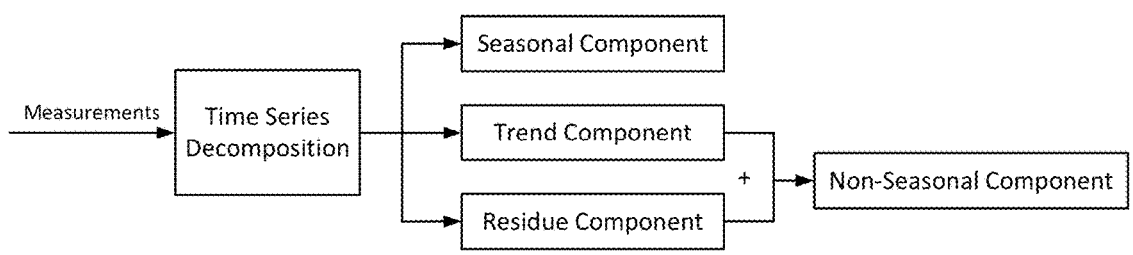
FIG. 4 illustrates an embodiment of a process for isolating non-seasonal components of measured event data using time series decomposition.
Figure 5:
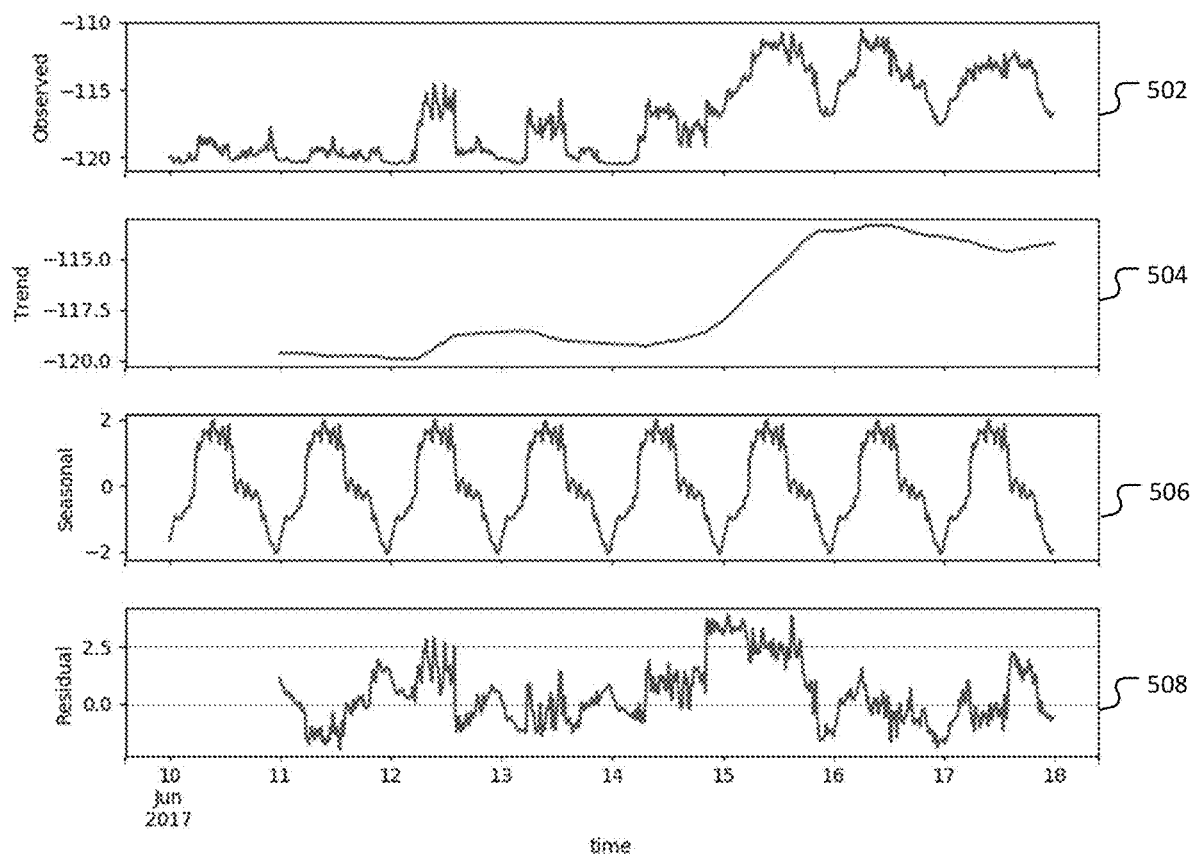
FIG. 5 illustrates original measurements and decomposed measurements.

Accordingly, non-seasonal components may be isolated from events at S308. FIG. 4 illustrates an embodiment of a process flow for isolating non-seasonal components of measured events using time series decomposition, while FIG. 5 illustrates event data before and after non-seasonal components have been removed. With reference to FIG. 4, a time series decomposition is performed on measured time-series events and divided into a seasonal component, a trend component, and a residue component. After the components have been separated, components other than the seasonal component, which in the case of FIG. 4 are trend and residue components, are combined into the non-seasonal component. In other embodiments, non-seasonal component may also include, for example, an aperiodic cyclic component, depending on how decomposition is performed.

FIG. 5 is a graphical illustration that shows an example of measured event data 502 which is decomposed to isolate seasonal and non-seasonal elements. The event data 502 is the original measurement data which is decomposed into trend component 504, seasonal component 506 and residual component 508.

In an embodiment, the trend and residue components 504 and 508 are added together to get the non-seasonal component. Alternatively, the seasonal component 506 can be subtracted from the original measurement time-series data 502 to isolate non-seasonal components. Typically, the periodicity of the seasonal component 506 is specified for time-decomposition routines.

A length of the measurement time-series may be set be such that the data includes multiple expected time-periods of the seasonal component 506. For example, event data for 2 or more days may be used for data that is affected a 24-hour season, and preferably for 4 or more days. Multiple seasons may be selected even when the time of interest is relatively small, e.g. a few minutes or a few hours. In some embodiments, multiple seasonal components for seasons of different durations are removed from the same data. For example, both weekly seasons and daily seasons may be removed from data that spans 2 or more weeks.

In another embodiment, the time series decomposition separates the time-series event data in to a seasonal component of known fixed period, a cyclic component with no constant period, a trend component and a residue component. In such an embodiment, depending upon the desired analysis interval, which may be the time-period over which related events are expected to be identified, a non-seasonal component may be constructed by summing the cyclic, trend and residue components or just the trend and residue components.

The non-seasonal time-series component vectors are compared over a selected time window to identify correlated behavior at S310. In one embodiment, correlation factors are used to compare non-seasonal time-series vectors. Examples of correlations that can be used are Spearman's correlation and Pearson's correlation. A high correlation coefficient indicates that measurements are related while a low correlation factor indicates that measurements are not related.

In experiments, the inventors have determined that correlation coefficients between measured events with seasonal components are commonly within a range of about 0.5 to 0.7, while after removing seasonal components, the same data commonly falls to less than 0.05 indicating that no correlation is present, while maintaining levels above 0.7 for events that are actually correlated. In an embodiment, a correlation score of 0.7 may be used as a threshold for determining that a correlation is present. Other embodiments may use different values such as 0.6 and 0.8 for a correlation. Persons of skill in the art will recognize that a particular threshold may be set in consideration of the type of correlation and circumstances.

Comparing the non-seasonal time series vectors is especially useful when small scale variations of the node measurements are expected to be correlated. In some circumstances, the average trend rather than the small-scale variations may be correlated. In these situations, the trend time series vectors of the node measurements, produced as a result of time series decomposition, can be directly compared.

Figure 6:
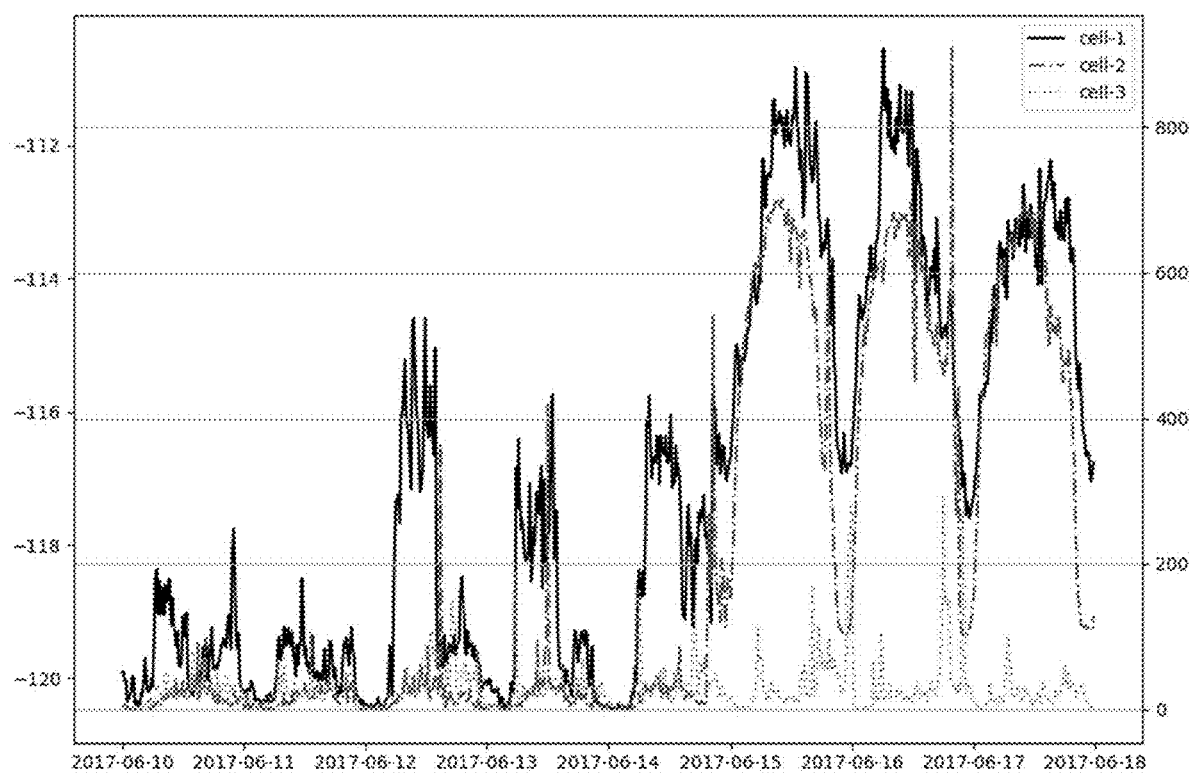
FIG. 6 illustrates original measurement data for network nodes.
Figure 7:
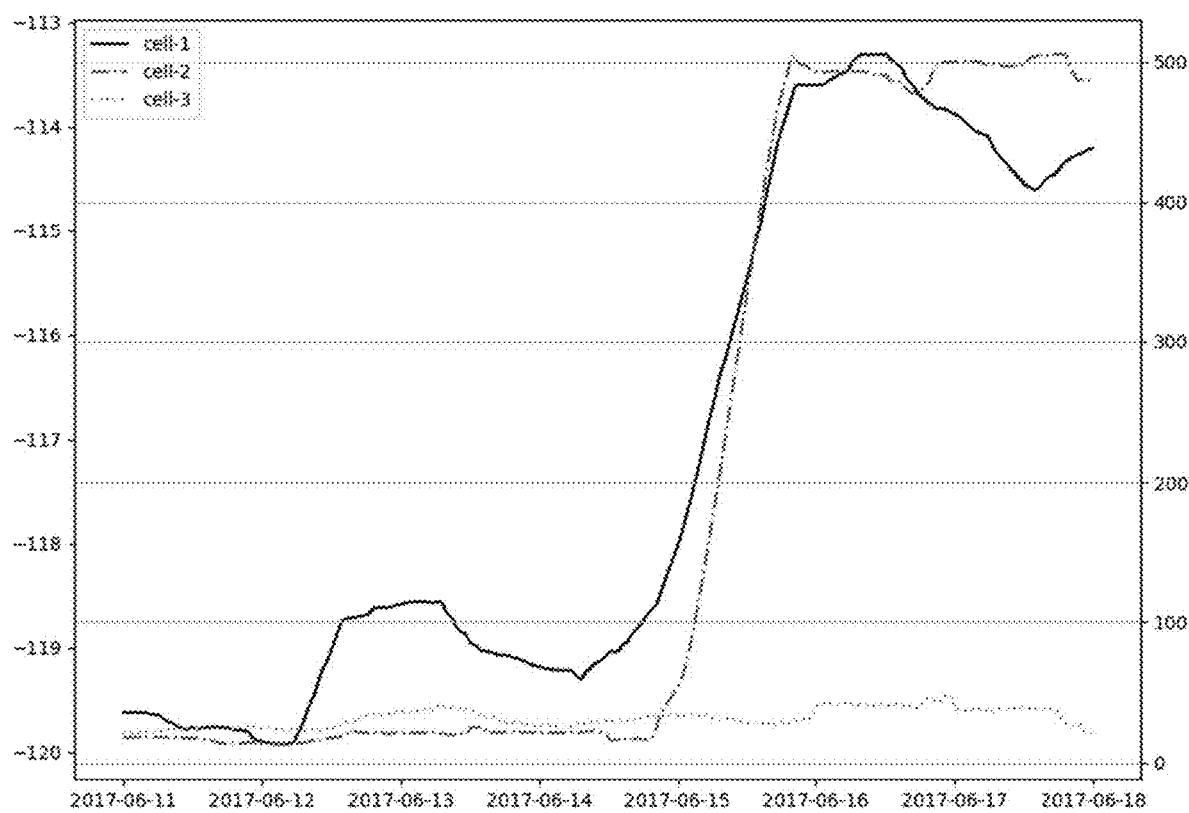
FIG. 7 illustrates a trend component of the measurement data of FIG. 6.

An example scenario where trend components used to find a correlation between cell measurements is shown in FIG. 6 and FIG. 7. FIG. 6 shows raw measurements of interference and traffic events—the left axis of the graph represents received power as interference, while the right axis represents traffic levels. The traffic levels are log scale, while the interference is expressed in decibels. Some correlation types such as Spearman's are relative, while others such as Pearson's are linear, so the type of correlation that is performed may depend on the scale of the measurements. There are three sets of data in FIG. 6—the solid line ("cell-1") is traffic levels at a first cell, the dotted line ("cell-2") is traffic levels averaged across a group of cells, and the dash-dot line ("cell-3") shows interference levels at a second cell.

FIG. 7 illustrates trend components that have been isolated from the event measurements of FIG. 6. It is apparent from a cursory examination of FIG. 7 that the traffic levels at the first cell are correlated with the interference levels at the second cell, and that the average traffic levels are not correlated with either the first cell traffic or the second cell interference. Accordingly, it is possible to determine whether events are correlated using only the trend component of the non-seasonal event measurements. Comparing trend components alone may be suitable for signatures that extend over multiple seasons. The residual component is not generally useful for multi-season correlations since it generally cancels out over extended periods of time.

In an embodiment, the analysis window is chosen such that it just encompasses the time interval in which the event is expected to occur and has enough points to do a comparison. In situations where it is unknown if the correlation will be with respect to small or large scale variations, or if both types of variations could be expected, comparisons could be made with respect to both summed non-seasonal time series vectors as well as the trend vectors in isolation.

In some embodiments, a correlation performed at S310 can be used to determine whether an event at a first node causes an event at a second node at S312. To identify if a first event at a first node causes a related second event at a second node, a non-seasonal time-series vector constructed for a measurement vector that can capture the first event at the first node is compared to a non-seasonal time-series vector constructed for a measurement vector that can capture the second event at the second node. For example, to identify if interference at a cell is caused by transmissions at the same or a neighboring cell, the non-seasonal time series vector constructed from an interference measurement at the first cell is compared with the non-seasonal time series vector constructed from a traffic measurement at the neighboring cell. Another example of determining whether an event at a first node causes and event at a second node is determining whether interference at a cell, as measured by the received interference power level, is the cause of a degradation of performance, as measured through a KPI such as a dropped call rate at the same cell. Thus, in some embodiments, it is possible to determine cause and effect relationships at the same cell.

An example of determining whether an event at a first node affects a second node can be seen with respect to FIG. 6 and FIG. 7. In this example, an operator would like to determine whether transmissions at a first cell cause interference at a second cell. After isolating the trend component from measurement data, it is apparent that the traffic at the first cell is correlated with the interference at the second cell. Accordingly, it can be determined that traffic at the first cell, e.g. uplink transmissions, causes interference at the second cell. The average traffic data is useful to validate the results by establishing that the trends of the first and second cells are independent of traffic elsewhere in the network.

Embodiments can determine whether an event at a first node affects additional nodes at S314. To identify if the same event affects multiple nodes, non-seasonal time series vectors of the same measurement from two nodes are compared over a chosen analysis window. An example of S314 will be explained with respect to FIG. 8 and FIG. 9.

Figure 8:
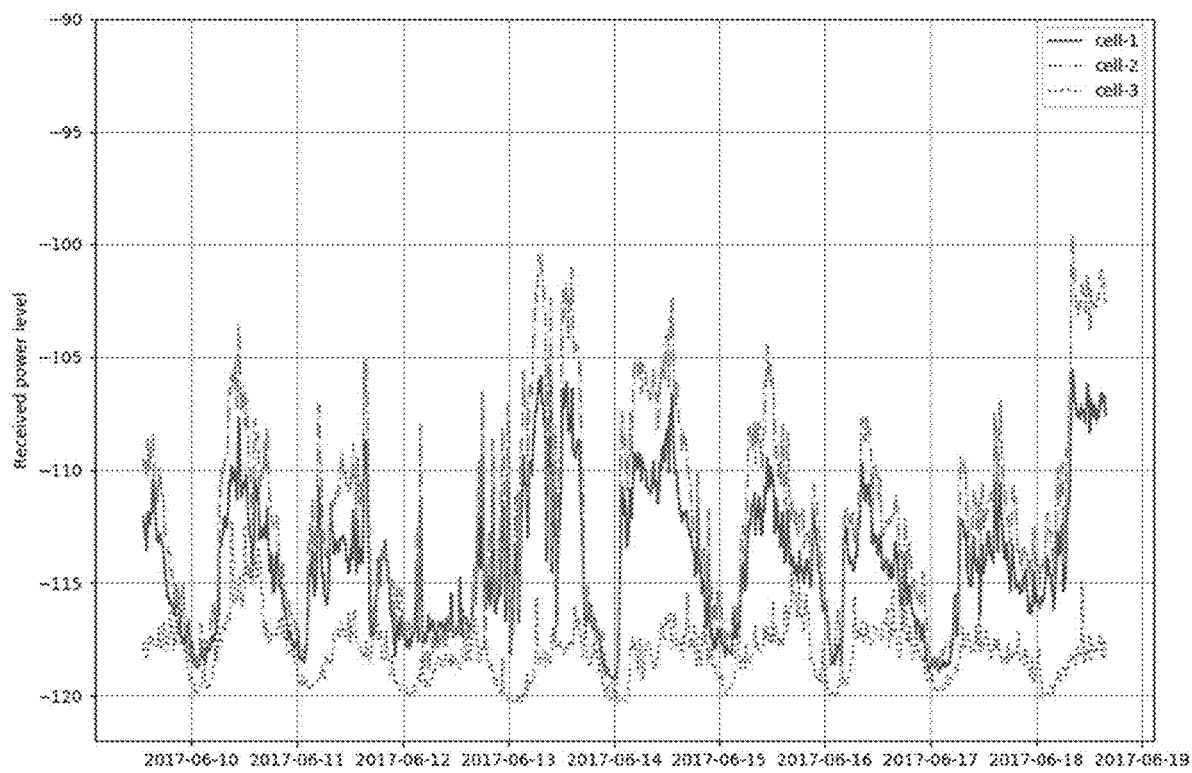
FIG. 8 illustrates original measurement data for network nodes.

FIG. 8 shows time-series interference measurements for two co-sited cells and one nearby neighbor cell. The co-sited cells are illustrated by the [blue] and [orange] lines, while the nearby neighbor cell is illustrated by the [green] line. In the measurements of FIG. 8, all three of the cells appear to have a degree of correlation due to a 24-hour seasonal component.

Figure 9:
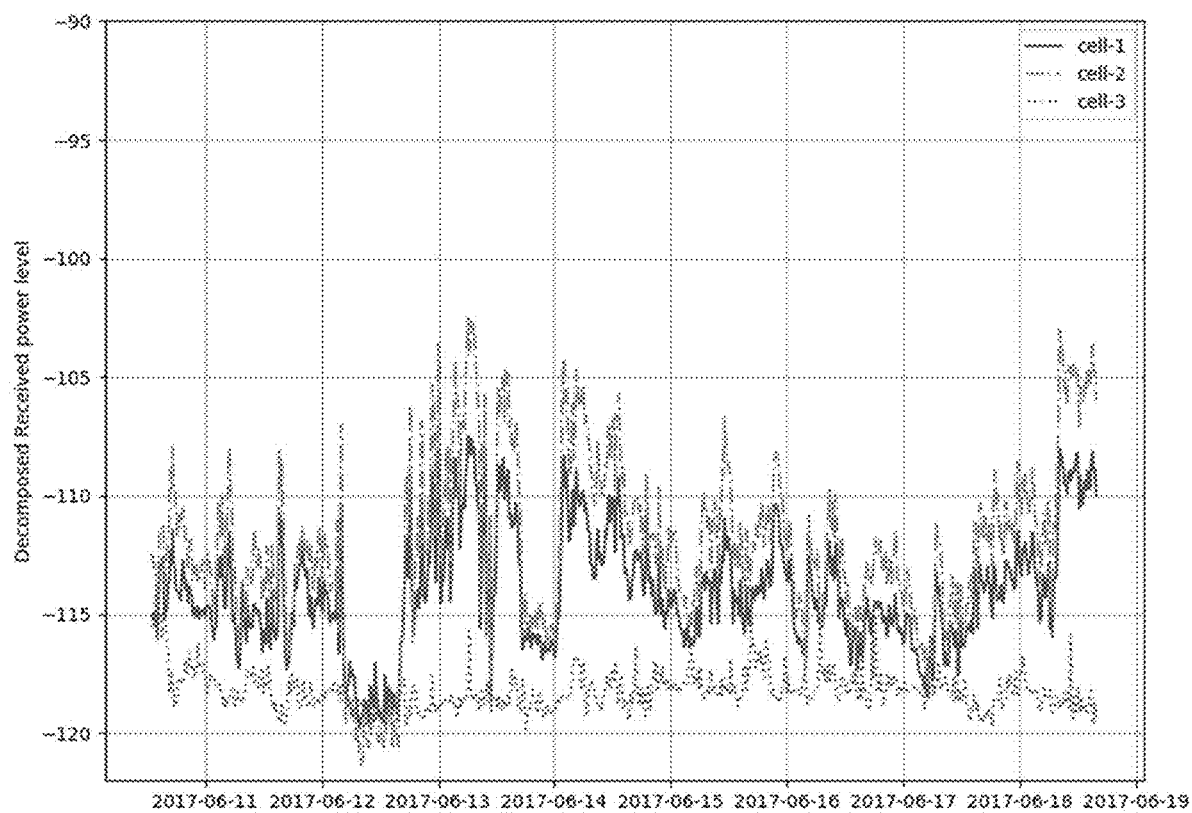
FIG. 9 illustrates non-seasonal components of the measurement data of FIG. 8.

FIG. 9 illustrates non-seasonal components of measurement data from the same three cells as FIG. 8. The data in FIG. 9 is a sum of the trend and residual components of the raw measurements illustrated in FIG. 8.

In FIG. 9, it is apparent that there is a relatively strong correlation between interference at the co-sited cells, and relatively low correlation between interference at the nearby neighbor cell and the co-sited cells. Interference that is present at co-sited cells but not nearby cells, especially when the co-sited cells are associated with base station antennas that have different pointing directions, suggests that the interference source is at or close to the cell-site. This information can be very useful to operators for identifying and eliminating problematic interference.

The following explanation is provided to help illustrate how embodiments of the present disclosure detect and characterize certain types of interference, especially broadband interference and PIM interference.

A multi-channel base station site which has multiple frequency channels in use (typically to build capacity via frequency layering), which could be multiple 3G, multiple 4G or even 3G, 4G and 2G services, has a number of transmitters transmitting relatively high power on downlink channels. If these transmit signals mix together through a non-linear device, they create sum and difference mixing products and harmonics of the transmitted signals. If any of these mixing products or harmonics happen to coincide with one or more of the uplink receive channel frequencies at use at the site, relatively high-power mixing products can be received by sensitive nearby receivers. In this case, the downlink transmitters are creating interference to one or more sensitive uplink receivers located at the same cell site.

Such interference can be caused by faulty amplifiers or other active devices, but the most common causes are via passive devices including oxidized coaxial cable connectors and oxidized grounding straps tying equipment together. Metal oxides form a semiconductor junction and turn a simple metal to metal connection into an implicit semiconductor diode. Diodes are very non-linear devices and they make great mixers (most radio transmitters and receivers use diode mixers internally to shift frequencies around when necessary). Accordingly, an oxidized metal to metal connection in the presence of strong transmitted RF energy can lead to PIM that can be problematic when the mixed transmit frequencies coincide with one of the receive channels in use at the same site.

When PIM does coincide with a receive channel, the resulting interference seen by that receiver will be strongly correlated to a function of the traffic being carried by the downlink transmitters that are mixing together to cause the problem. Therefore, an embodiment may make one or more of the following determinations:

Is a relatively high level of uplink interference present in a receive channel?
Can the downlink channels in use at a cell mix together to coincide with the interfered receive channel?
Do co-site receivers using that same channel at the same cell site see time correlated interference?
Do distant neighbor cells fail to detect strongly time correlated interference events?
Is the detected interference strongly time correlated to a function of downlink traffic from co-site transmitters that could mix to cause problems?

When the answer to all or some portion of these determinations is positive, then an embodiment of the present application may indicate that PIM is present at the cell site.

Embodiments of the present disclosure are well suited to detecting PIM products. For example, PIM can be determined by a correlation between a function of a cell's transmit power and interference at the cell. Because PIM products are a known phenomenon, they occur at predictable energy levels and frequencies. These energy levels and frequencies can be used to refine automatic analysis performed by spectrum analysis server 140 to identify PIM as a cause of interference at a target base station with a high level of probability.

A number of interference characteristics of a source of interference can be determined from embodiments of this disclosure as well, such as magnitude and frequency. Magnitude of a source of interference can be estimated by the number and extent to which interference is correlated at neighbor cells, while frequency characteristics can be determined by analyzing which frequencies are affected. This information may then be correlated with a list of known, pre-characterized interference sources to aid network operators in the detection of the interference source. This data, which may include raw data, reports, etc., may be used by network operator personnel to identify and eliminate sources of interference that are negatively affecting network performance.

In addition to detecting PIM, embodiments of the present disclosure can be used to identify the location of a source of interference. The localization process may include triangulation or trilateration based on location, as well as antenna pointing angles and the detected noise amplitudes of each affected cell.

Figure 10:
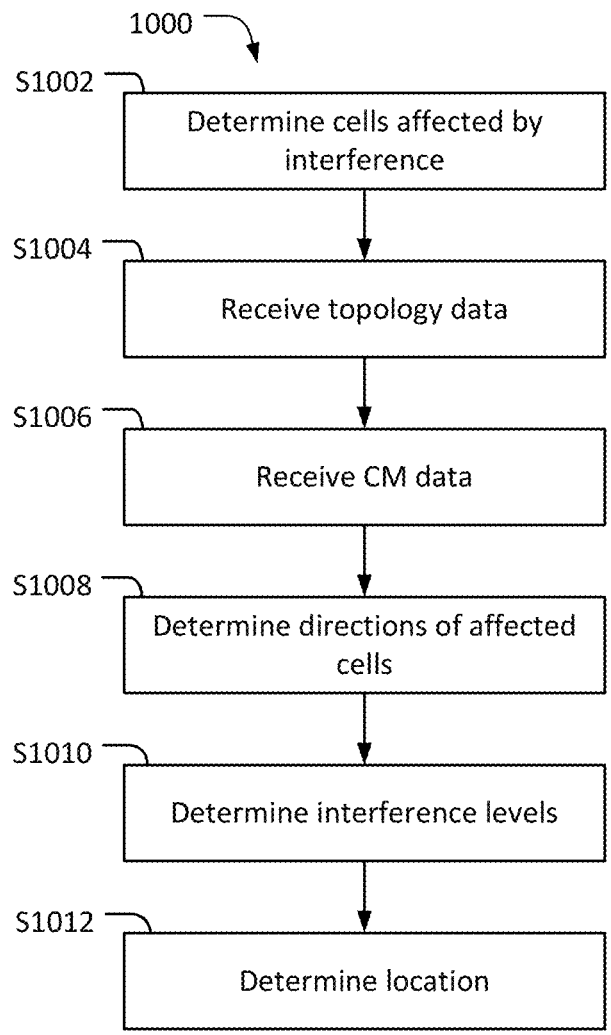
FIG. 10 illustrates an embodiment of a localization process.

FIG. 10 shows an embodiment of a process 1000 for localizing an interference source. A plurality of cells that are affected by interference are determined at S1002 by performing process 300 as described above.

Network topology data is received at S1004. The network topology data may include geographical coordinates of the cells that are affected by interference, which may be expressed as latitude and longitude coordinates for each cell. Additional topology data may include elevation data for the cells, and data related to the surrounding network environment that could affect RF propagation, such as locations of commercial structures, bodies of water, etc.

Configuration Management (CM) data is received at S1006. The CM data may include, for example, frequencies used by the cells, pointing directions, azimuth, elevation, half-power beamwidth, transmission power, etc. The CM data may be received in response to a request specifically transmitted for process 1000 or may be stored by a spectrum analysis server 140 for use in multiple processes.

Figure 11:
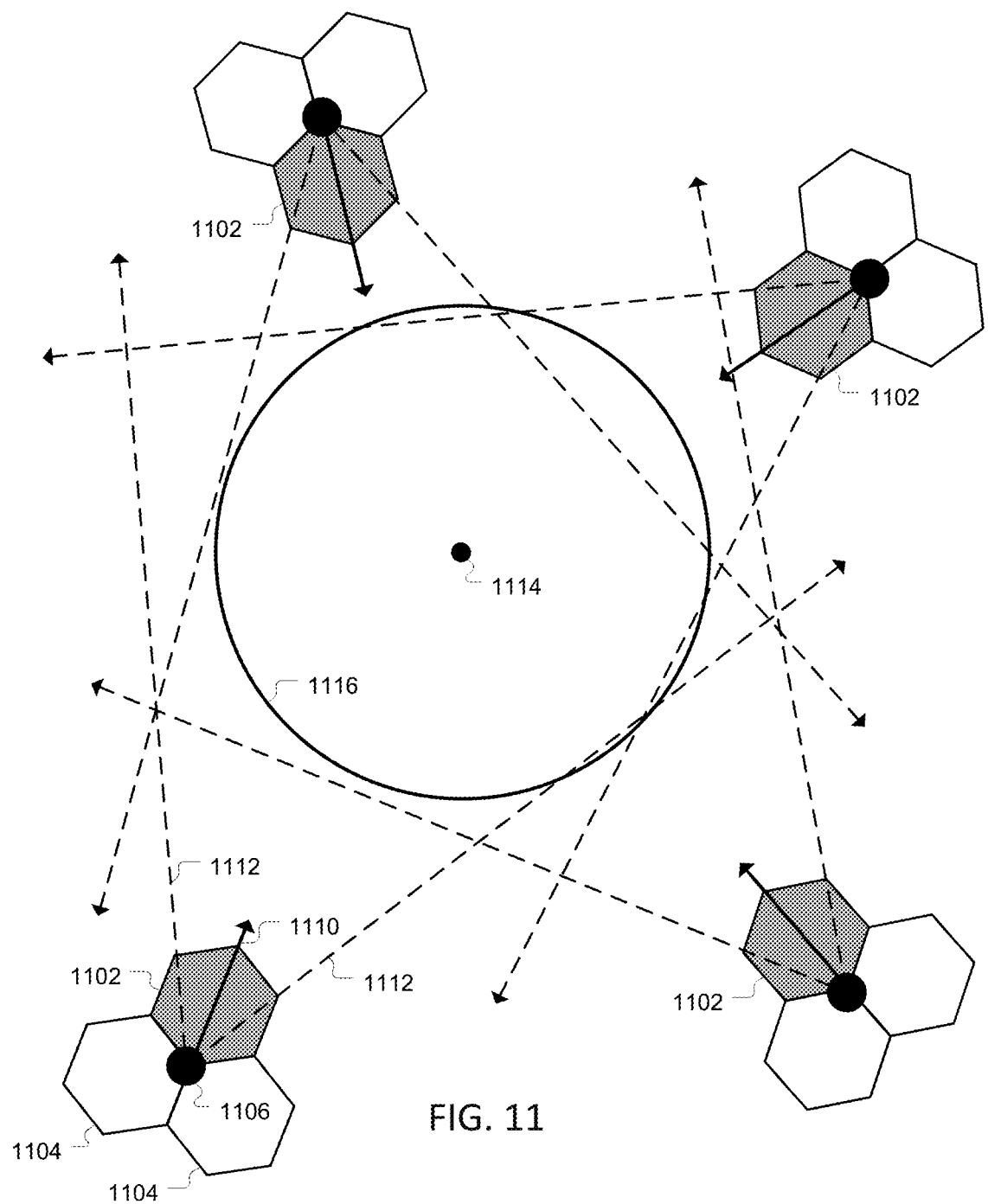
FIG. 11 illustrates an embodiment of the localization process of FIG. 10.

FIG. 11 shows a plurality of cells 1102 that are affected by interference. One of the cells 1102 may be a target cell, while the other cells are neighbor cells that are correlated with the target cell. Co-site cells 1104 of a cell site 1106 are shown in FIG. 11 as well, but for the purposes of this example they are not affected by interference.

The direction 1110 of cells 1102 that are affected by interference are determined at S1008. While FIG. 11 shows direction 1110 as being the pointing direction of antennas, or azimuth, embodiments may determine additional direction information at S1008. For example, half-power beamwidth may be determined in order to establish antenna transmission areas 1112, which may vary between cells according to transmission power.

Interference amplitude of affected cells is determined at S1010. In an embodiment, interference levels may be extracted from network event recordings. The magnitude of interference can be used as a proxy for distance from the cells to localize an interference source.

The location of a source of interference is determined at S1014 using one or more of the data collected for process 1000. In an embodiment, a location is a point 1114 that is determined to have the highest probability of being the source of the interference based on analyzing the cell data in process 1000. However, the location data may be presented in many different ways.

For example, in one embodiment, the location data is an area 1116. The area 1116 may be determined from a statistical process, such as a probability value, where data analysis suggests that there is, for example, a 90% probability that a source of interference is within the area. In other embodiments, the location data may be expressed as an asymmetric heat map, a plurality of concentric circles or other shapes representing a distribution of probabilities, etc.

The accuracy of interference localization depends on the number of and location of correlated high noise rise neighbor cells, as well as the amount of available data for the cells, such as pointing direction and half-power beamwidth. Persons of skill in the art will recognize that a number of different approaches can be taken to calculate location using cell data, such as triangulation, trilateration, etc. Examples of some of the techniques that could be employed can be found, for example, in U.S. application Ser. No. 14/827,226.

When one or more target cell is classified as being affected by regional interference, personnel can use the localization information, such as a localization map or geographic coordinates, to identify a specific area as having the highest probability of being the location of the source of interference. Process 1000 may further characterize the interference with, for example, time and frequency information, that can help a network operator rapidly and efficiently identify its source. For example, time, amplitude and frequency characteristics can be used to determine that interference is from a predetermined source, such as a sparking electrical coupling or a radar installation.

Embodiments of the present disclosure represent a number of improvements to existing wireless communication technology. Conventional approaches to comparing measurements between nodes in a wireless network are often obscured by seasonal components that suggest relatively high correlations even when no actual correlation is present. However, embodiments of the present disclosure remove seasonal components from measurements so that it is possible to establish clear and accurate correlations between measurements at various network nodes.

The ability to perform accurate correlations facilitates many possible network optimizations and provides a number of reliable tools to network operators. For example, it is possible to determine whether interference at one node affects other nearby nodes, and cause-effect relationships between nodes, with a level of accuracy that was not previously possible. It is not possible to reliably determine correlations between nodes in the presence of strong seasonal components without embodiments of the present disclosure. As such, embodiments of this disclosure are substantial improvements to wireless networking technology.

Embodiments of the present disclosure are especially well suited to identifying, characterizing and localizing interference. Data suggests that from 5% to 10% of existing cells are under-performing as a result of unintentional non-cellular interference. The sources of such interference vary greatly, and include poorly insulated transformers, corroded connections, and unregulated transmitters.

As discussed above, embodiments of this disclosure can be used to determine when non-cellular interference such as PIM is affecting a cell. The system and processes described here can be used to determine whether interference that affects one node is experienced by other nodes, and can characterize the interference sufficiently to identify, for example, whether the interference is local to a single base station by correlating co-sited cells, or external to a base station by correlating with neighbor cells.

An operator can use this information to deploy personnel to remedy the physical cause of interference, such as replacing an oxidized connector or notifying a power company of a malfunctioning component. An operator may be a licensor of RF spectrum that operates a cellular telecommunications network. Furthermore, embodiments of the present disclosure can analyze and characterize interference without requiring network service interruptions, and without installing additional energy sensing equipment in network areas.

In addition to interference identification, characterization and elimination, embodiments of this disclosure are applicable to the emerging field of spectrum sharing. In shared spectrum systems, multiple network operators, each maintaining their network, communications and sensing devices cooperatively, share specific blocks of radio frequency spectrum. In such a system it is beneficial to rapidly detect interference conflicts between various operators such that spectrum sharing policies can be updated in real-time to resolve such conflicts. Embodiments of this disclosure support spectrum sharing by providing network operations teams with analytical tools such that they can observe interference from other users transmitting in the associated spectrum bands, and can determine whether events at a node of one network have effects that are experienced by nodes of another network.

Embodiments of this disclosure aggregate and correlate information from available but disparate sources for the purpose of detecting unintentional local or external interference to a wireless network. An embodiment may gather network performance data, network topology data, network configuration data, and network event data. From these conventionally isolated information sources, embodiments may isolate non-seasonal components of time-series event data and correlate the event data to determine instances of localized cell site interference or regional external system interference. Additional steps may be performed to localize the origins of external system interference.

What is claimed is:

1. A method for a wireless telecommunications network, the method comprising:
receiving first event measurements of a first event that were measured at a first node of a wireless communication network over a time interval, wherein the first event is caused by non-cellular interference;
receiving second event measurements of a second event that were measured at a second node of the wireless communication network over the time interval;
removing seasonal components from the first event measurements to create first non-seasonal event data;

removing seasonal components from the second event measurements to create second non-seasonal event data;
comparing the first non-seasonal event data with the second non-seasonal event data to determine whether the first event measured by the first node correlates with the second event measured at the second node;
determining which cells are affected by the non-cellular interference; and
using data for the affected cells to locate a source of the non-cellular interference.

2. The method of claim 1, wherein, when the first event experienced by the first node correlates with the second event measured at the second node, determining that the first node and the second node are both affected by the same interference.

3. The method of claim 2, wherein the first and second nodes are co-sited cells, the method further comprising:
receiving interference measurements for a plurality of cells that are neighbors of one or both of the co-sited cells;
removing seasonal components from the neighbor interference measurements to create non-seasonal neighbor interference data; and
comparing at least one of the first non-seasonal event data and the second non-seasonal event data with the non-seasonal neighbor interference data to determine whether a correlation is present.

4. The method of claim 3, further comprising:
when no correlation is present, determining that interference experienced by the co-sited cells is local to a cell site of the co-sited cells.

5. The method of claim 1, wherein the first non-seasonal event data is a trend component of the first event data, and the second non-seasonal event data is a trend component of the second event data.

6. The method of claim 1, further comprising:
measuring the first event at the first node; and
measuring the second event at the second node.

7. The method of claim 1, further comprising:
performing time-series decomposition on the first and second measurement data to remove the seasonal components.

8. A method for a wireless telecommunications network, the method comprising:
measuring a first event that were measured at a first node of a wireless communication network over a time interval, wherein the first event is caused by non-cellular interference;
measuring a second event at a second node of the wireless communication network over the time interval;
removing seasonal components from the first event measurements to create first non-seasonal event data;
removing seasonal components from the second event measurements to create second non-seasonal event data;
comparing the first non-seasonal event data with the second non-seasonal event data to determine whether the first event measured by the first node correlates with the second event measured at the second node;
determining which cells are affected by the non-cellular interference; and
using data for the affected cells to locate a source of the non-cellular interference.

9. The method of claim 8, wherein, when the first event experienced by the first node correlates with the second event measured at the second node, determining that the first node and the second node are both affected by the same interference.

10. The method of claim 8, wherein the first and second nodes are co-sited cells, the method further comprising:
receiving interference measurements for a plurality of cells that are neighbors of one or both of the co-sited cells;
removing seasonal components from the neighbor interference measurements to create non-seasonal neighbor interference data; and
comparing at least one of the first non-seasonal event data and the second non-seasonal event data with the non-seasonal neighbor interference data to determine whether a correlation is present.

11. The method of claim 10, further comprising:
when no correlation is present, determining that interference experienced by the co-sited cells is local to a cell site of the co-sited cells.

12. The method of claim 8, wherein the first non-seasonal event data is a trend component of the first event data, and the second non-seasonal event data is a trend component of the second event data.

13. A non-transitory computer-readable medium with computer-executable instructions stored thereon which, when executed by a processor, perform the following operations:
accessing first event measurements of a first event that were measured at a first node of a wireless communication network over a time interval, wherein the first event is caused by non-cellular interference;
accessing second event measurements of a second event that were measured at a second node of the wireless communication network over the time interval;
removing seasonal components from the first event measurements to create first non-seasonal event data;
removing seasonal components from the second event measurements to create second non-seasonal event data;
comparing the first non-seasonal event data with the second non-seasonal event data to determine whether the first event measured by the first node correlates with the second event measured at the second node;
determining which cells are affected by the non-cellular interference; and
using data for the affected cells to locate a source of the non-cellular interference.

* * * * *